United States Patent [19]
Chikuma

[11] Patent Number: 5,341,449
[45] Date of Patent: Aug. 23, 1994

[54] WAVELENGTH CONVERTING DEVICE AND ITS METHOD FOR MANUFACTURING

[75] Inventor: Kiyofumi Chikuma, Tsurugashima, Japan

[73] Assignee: Pioneer Electronic Corporation, Tokyo, Japan

[21] Appl. No.: 10,191

[22] Filed: Jan. 28, 1993

[30] Foreign Application Priority Data

Feb. 21, 1992 [JP] Japan .................................. 4-35302

[51] Int. Cl.⁵ .............................................. G02F 1/37
[52] U.S. Cl. ................................ 385/122; 359/328; 359/332
[58] Field of Search ............................ 385/122, 129; 359/326–332

[56] References Cited

U.S. PATENT DOCUMENTS

| | | | |
|---|---|---|---|
| 4,971,416 | 11/1990 | Khanarian et al. | 359/328 |
| 5,052,770 | 10/1991 | Papuchon | 359/328 |
| 5,109,462 | 4/1992 | Watanabe et al. | 359/328 |
| 5,170,460 | 12/1992 | Arvidsson et al. | 385/129 |

FOREIGN PATENT DOCUMENTS 3-219214  9/1991  Japan ................................ 385/122

Primary Examiner—John D. Lee
Attorney, Agent, or Firm—Sughrue, Mion, Zinn, Macpeak & Seas

[57] ABSTRACT

An object of the present invention is to provide a wavelength converting device which generates a second harmonic by directly leading a laser beam emitted from a semiconductor laser to a waveguide. A waveguide is formed on a plate-shaped device substrate made of LiNbO₃. The polarization of the waveguide is perpendicular to both the waveguide direction of the waveguide and a normal direction of the main surface of the device substrate. Further, the polarization of the waveguide is periodically inverted by the polarization inverting layers along the waveguide direction of the waveguide.

8 Claims, 5 Drawing Sheets

C AXIS

C AXIS

C AXIS

WAVELENGTH CONVERTING DEVICE AND ITS METHOD FOR MANUFACTURING

BACKGROUND OF THE INVENTION

1. Field of the Invention

This invention relates to a wavelength converting device for generating a second harmonic of an incident laser beam and its manufacturing method.

2. Description of the Related Background Art

With regard to a wavelength converting device for generating a second harmonic of an incident laser beam, a device utilizing what is called QPM (quasi phase matching) is known.

In a nonlinear optical crystal used as a substrate of the device, an output of a polarization wave periodically repeats the maximum and minimum values every interference distance called a coherent length $L_c$ in association with its propagation. Thus, the QPM is a phase matching means for causing the phase of the polarization wave generated every coherent length $L_c$ to be alternately inverted and then added without mutually setting off so that an output of the second harmonic is increased.

A wavelength converting device utilizing the QPM includes a periodic polarization inverting structure where polarization inverting layers are periodically formed along the waveguide direction of a waveguide made of a ferroelectric.

To periodically invert the phase of the polarization wave, it is sufficient to invert the sign of a nonlinear coefficient. In the ferroelectric, inverting characteristics of domains are used. For instance, in case of lithium niobate ($LiNbo_3$) crystal, a ferroelectric domain structure has an inverted domain where the polarization can invert at 180 degree in the direction of a c-axis. Particularly, a phenomenon is used such that a polarization inversion can easily occur on a +c surface due to various external factors such as impurities, distortion stress, heat, electric field, and the like.

In case of using the $LiNbO_3$ crystal as a device substrate, for instance, as shown in FIG. 1, the c-axis direction of the crystal is set to the thickness direction of a device substrate 1 and a periodic inverting structure is formed on a +c surface 2 as a main surface. The periodic inverting structure is formed by the following method. For instance, at first, the direction of the spontaneous polarization of the device substrate 1 is aligned to the c-axis direction. After that, a periodic pattern of Ti (titanium) is formed on the +c surface 2 and is thermally processed for one hour at a temperature (about 1035° C.) which is slightly lower than its Curie temperature and is suddenly cooled. The periodic inverting structure is consequently formed by a plurality of polarization inverting layers 3 formed every intervals. In the polarization inverting layer 3, the polarization is directed in the direction opposite to the original polarization of the device substrate 1. After that, a waveguide 4 is formed at a low temperature by a proton exchanging method so that a waveguide direction traverses the polarization inverting layers 3.

In a wavelength converting device 5 formed as mentioned above, the polarization of the polarization inverting laser 3 is parallel to the c-axis direction of the crystal and is directed in the thickness direction of the waveguide 4 as shown by arrows in FIG. 1.

In case of generating a second harmonic by using the wavelength converting device with the above structure and a semiconductor laser, a laser beam emitted from the semiconductor layer is emitted from a near-field in the TE mode. On the other hand, a waveguide mode waveguided in the waveguide of the wavelength converting device is a TM mode. Thus, when the laser beam in the TE mode merely passes into the wavelength converting device through a lens, the second harmonic can hardly excite in the waveguide. Since means for matching both of the modes to each other is necessary, the near-field of the semiconductor laser and the incident surface of the waveguide cannot directly be coupled to each other. Thus, as shown in FIG. 2, a collimator lens 7, a half-wave plate 8, and a coupling lens 9 are necessary, and they are sequentially arranged on the optical path between a semiconductor laser 6 and the wavelength converting device 5 from the laser 6 side. Therefore, the plane of the polarization is caused to be rotated so that the laser beam is allowed to enter the wavelength converting device 5.

To rotate the plane of the polarization of the laser beam by 90°, an apparatus for generating the second harmonic needs a number of elements to be assembled and it is difficult to make the apparatus at a lower price.

OBJECTS AND SUMMARY OF THE INVENTION

An object of the present invention is to provide a wavelength converting device having a structure which can allow a laser beam emitted from a semiconductor laser to directly enter a wavelength converting device and also to provide a method for manufacturing said device.

According to the present invention, a wavelength converting device have a waveguide made of a nonlinear optical crystal for generating a second harmonic of an incident laser beam, wherein said waveguide comprises: a plurality of polarization inverting layers in which polarization is perpendicular to both a waveguide direction of the waveguide and a direction of a normal of a main surface of a device substrate of said device, said polarization being periodically inverted along the waveguide direction.

According to the present invention, a method for manufacturing a wavelength converting device comprises the steps of: periodically forming a plurality of polarization inverting layers by scanning an electron beam a plurality of times every predetermined intervals on a surface which crosses a polarization of a nonlinear optical crystal block; cutting out a device substrate from said nonlinear optical crystal block in which the polarization inverting layers has been formed so that a normal of a main surface of the device substrate is caused to be perpendicular to said polarization; and forming a waveguide onto the main surface of the device substrate, said waveguide extending perpendicularly to the polarization of each of said polarization inverting layers as a waveguide direction.

In a wavelength converting device according to the present invention, the polarization of the waveguide is periodically inverted and perpendicular to both the waveguide direction of the waveguide and the normal of the main surface of the device substrate, so that the waveguide mode in the waveguide becomes the TE mode. Thus, for instance, the laser beam in the TE mode emitted from the semiconductor laser or the like is directly supplied into the wavelength converting device without passing through any optical elements such as half-wave plate, TE-TM converter, and the like, so that the second harmonic of the laser beam is produced.

In a manufacturing method according to the present invention, it is possible to provide the wavelength converting device in which the polarization of respective polarization inverting layers formed periodically along the waveguide direction of the waveguide is perpendicular to both the waveguide direction of the waveguide and the normal of the main surface of the device substrate.

DETAILED DESCRIPTION OF THE PREFERRED EMBODIMENT

A wavelength converting device according to the present invention and its manufacturing method will now be described with reference to FIGS. 3-9.

Figure 1:
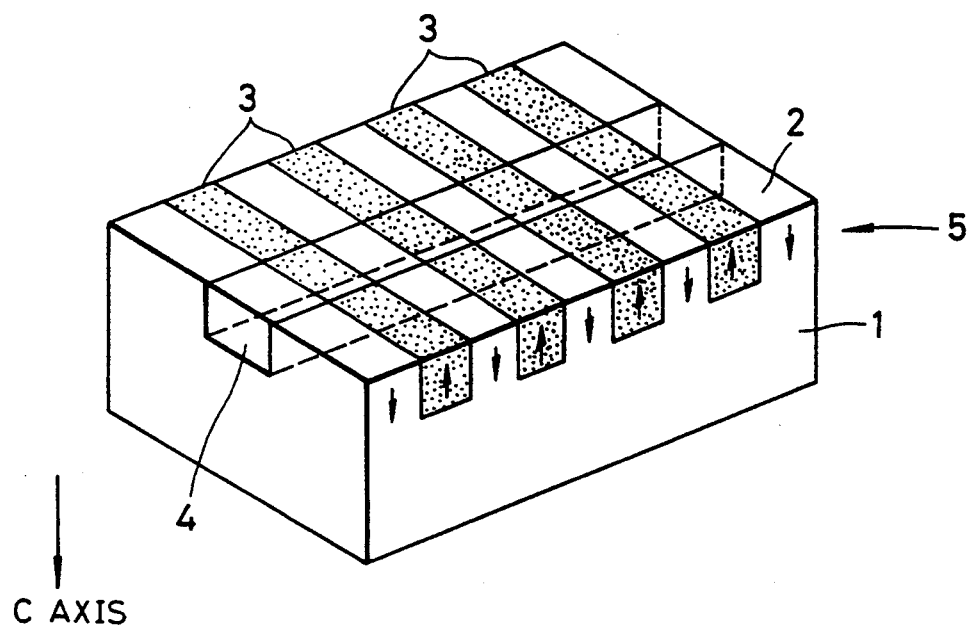
FIG. 1 is a perspective view showing a conventional wavelength converting device.
Figure 2:
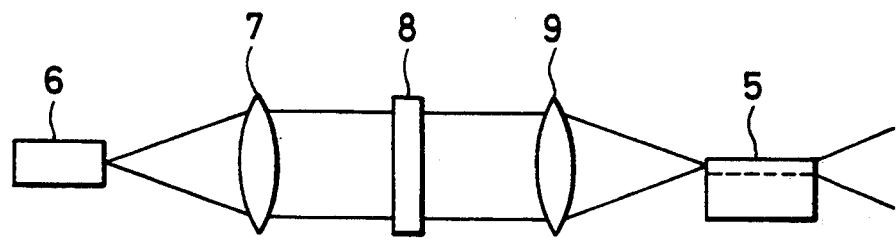
FIG. 2 is a schematic showing an apparatus including the conventional wavelength converting device for generating a second harmonic.
Figure 3:
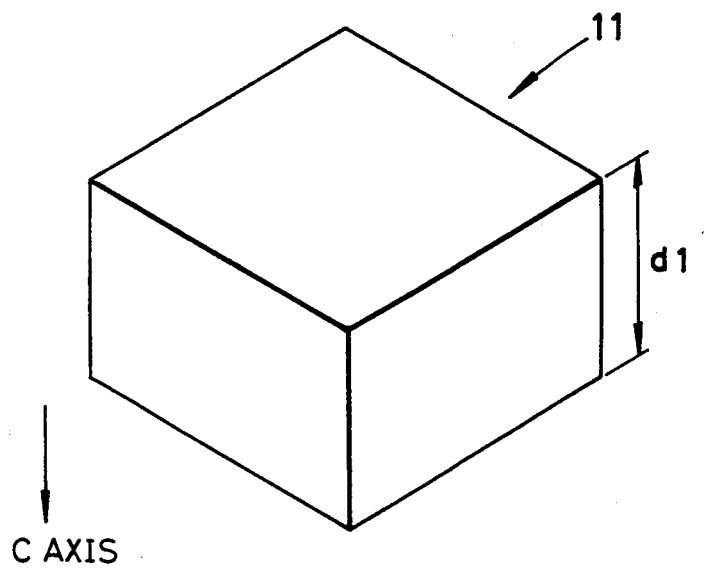
FIG. 3 is a perspective view showing a crystal block where wavelength converting devices according to the present invention are formed.

In FIG. 3, reference numeral 11 denotes a crystal block of a nonlinear optical crystal. The crystal block 11 is made of a ferroelectric such as $LiNbO_3$, lithium showing ($LiTaO_3$), or the like and it is formed in a square shape having a thickness $d_1$ of about a few mm. In the crystal block 11, the spontaneous polarization is aligned by an external electric field to the + direction (direction shown by an arrow in Figures) of a c-axis which is one of three crystal axes.

Figure 4:
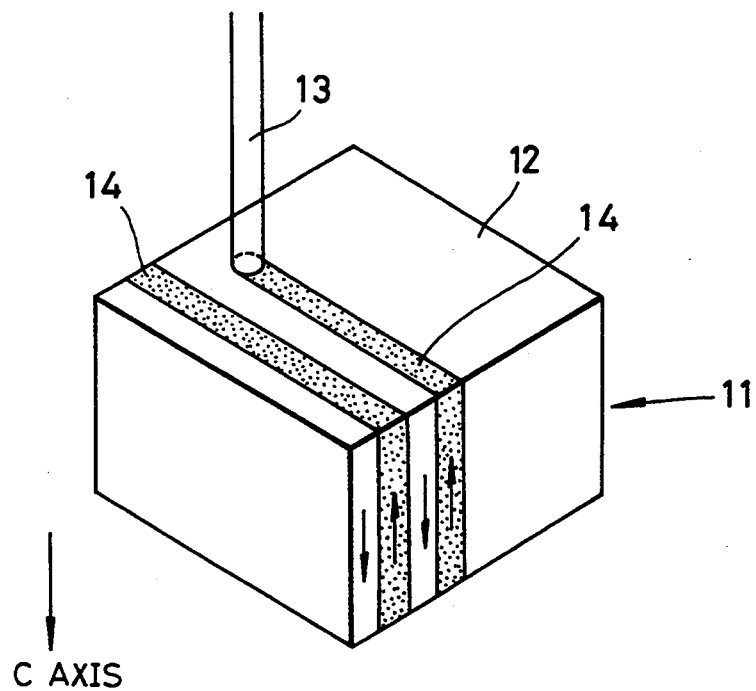
FIG. 4 is a perspective view showing a step of forming polarization inverting layers in a manufacturing method according to the present invention.

As shown in FIG. 4, an electron beam 13 is scanned to a −c surface 12 of the crystal block 11 at predetermined intervals while impinging the electron beam onto the −c surface in the +c axis direction. In the region heated by the electron beam 13, the spontaneous polarization is inverted so that a polarization inverting layer 14 whose polarization is directed in the −c axis direction is formed while the c axis direction is set to the depth direction. Further, the polarization inverting layers 14 are periodically formed in accordance with the scan intervals of the electron beam 13.

Figure 5:
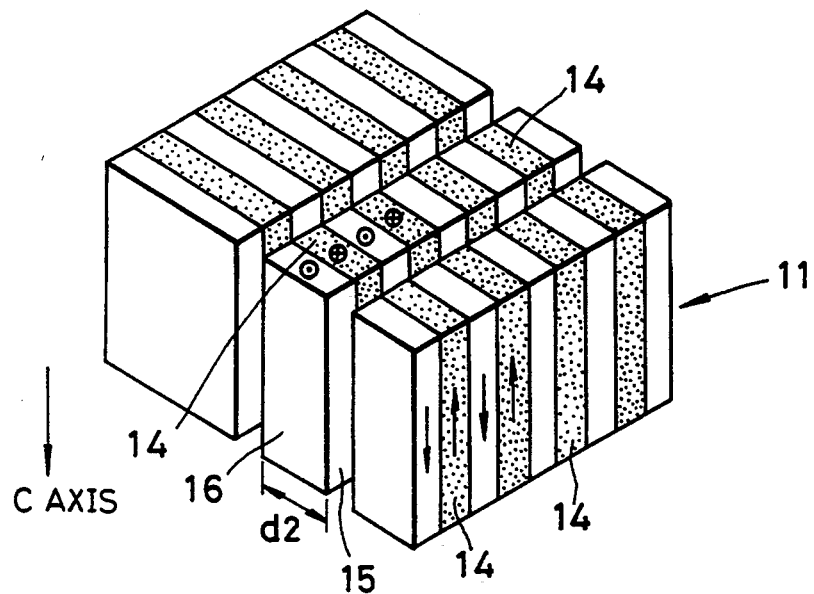
FIG. 5 is a perspective view showing a step of cutting out a device substrate from said crystal block.

As shown in FIG. 5, the crystal block 11 is subsequently cut out almost perpendicularly to the polarization inverting layers 14 and along the c axis direction by mechanical machining means (not shown) such as a lathe or the like so as to have a width $d_2$. Thus, a device substrate 16 having a main surface 15 is cut out, and then a normal of the main surface 15 is perpendicular to the c axis direction. The dimensions of the device substrate 16 are set to, for instance, a width w of 2 to 3 mm and a thickness $d_2$ of 0.5 mm.

Figure 6:
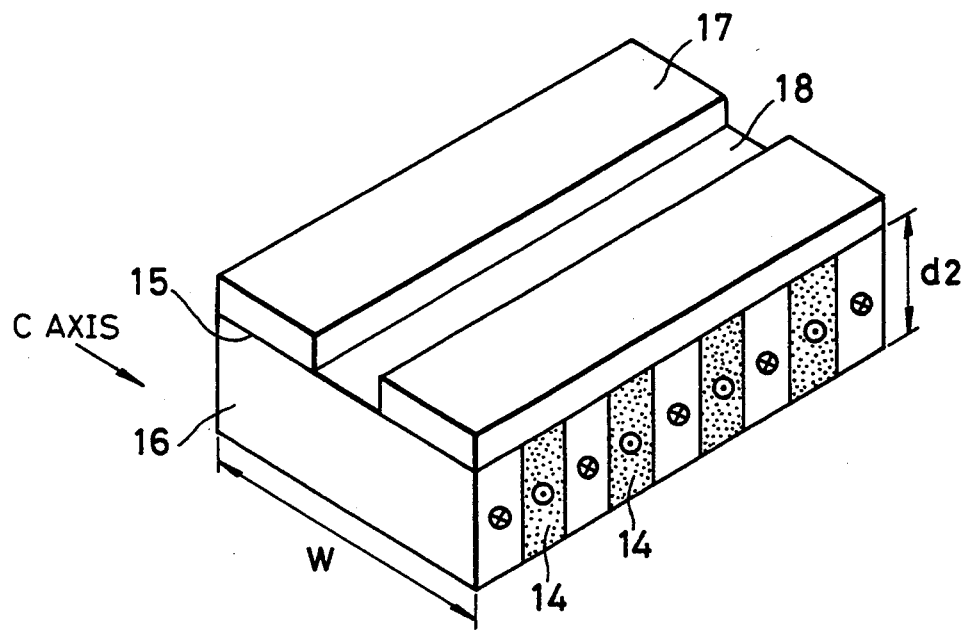
FIG. 6 is a perspective view showing a patterning step in order to form a waveguide in said device substrate.

As shown in FIG. 6, a resist film 17 is formed on one main face 15 of the device substrate 16. Then a pattern of a waveguide which extends perpendicularly to the polarization of each polarization inverting layer 14 as a waveguide direction is photosensitively formed on the resist film 17 with a mask (not shown), so that an opening pattern 18 corresponding to the waveguide is formed on the resist film 17.

Figure 7:
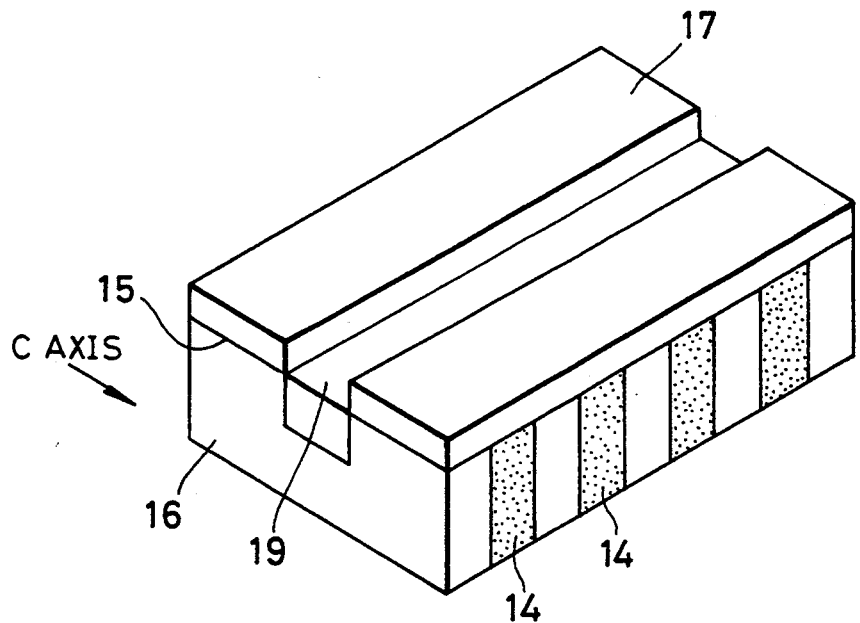
FIG. 7 is a perspective view showing a step of forming the waveguide in the device substrate.

As shown in FIG. 7, a waveguide 19 which extends perpendicularly to the polarization of each polarization inverting layer 14 as the waveguide direction is formed in the region on the main surface 15 of the device substrate 16 corresponding to the opening pattern 17 by a proton exchanging method. A similar waveguide 19 can be also formed by what is called Ti diffusion method. In this method, after Ti film is evaporated onto the main surface 15, a mask is formed by Ti film so as to have a stripe shape. And then an etching is executed and a heat treatment is performed for the devise substrate. The resist film 17 is removed after the waveguide 19 is formed.

Figure 8:
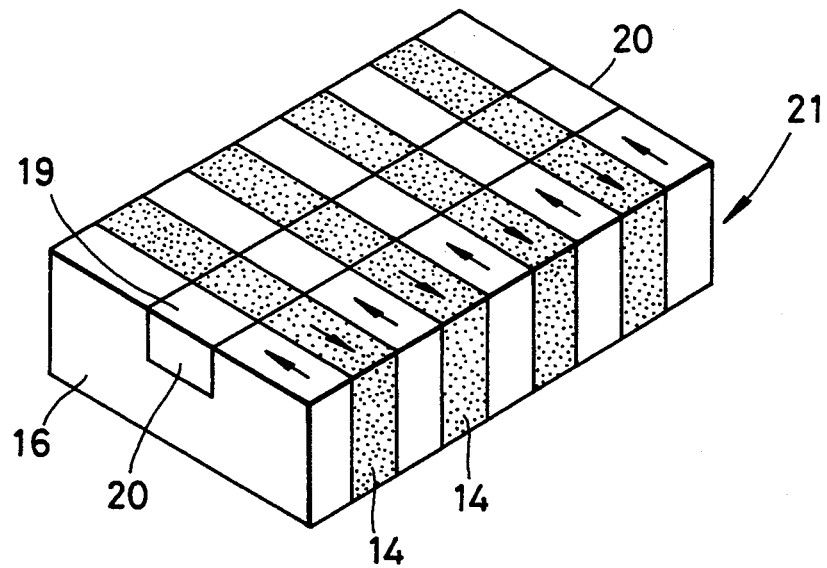
FIG. 8 is a perspective view showing the wavelength converting device according to the present invention.

As shown in FIG. 8, each of surfaces 20 of the waveguide 19 formed on both sides of the device substrate 16 are polished. In this manner, a wavelength converting device 21 utilizing the QPM is manufactured.

In the wavelength converting device 21 manufactured as mentioned above, the polarization inverting layers 14 are periodically formed in the waveguide direction of the waveguide 19. The polarization of each polarization inverting layer 14 is perpendicular to the waveguide direction of the waveguide 19 and is also perpendicular to the normal of the main surface 15.

A length of the polarization inverting layer 14 in the waveguide direction of the waveguide 19 and a period of the polarization inverting layers 14 are respectively designed in accordance with the kind of ferroelectric, a length and a width of the waveguide 19, and the like.

The operation of the embodiment will now be described.

Figure 9:
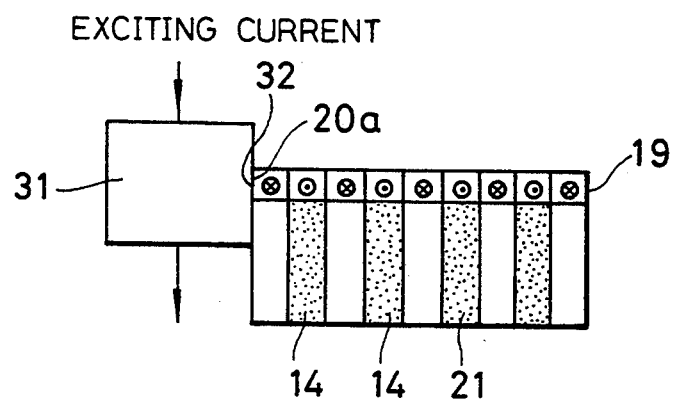
FIG. 9 is a schematic showing an apparatus including the wavelength converting device according to the invention for generating a second harmonic.

In case of producing the second harmonic by using the wavelength converting device 21, for instance, a semiconductor laser 31 is used as a laser devise as shown in FIG. 9. A near-field 32 of the semiconductor laser 31 is directly coupled to an incident surface 20a as one of the side surfaces of the waveguide 19 of the wavelength converting device 21, so that the laser beam allowed to enter as a fundamental wave into the incident surface 20a of the waveguide 19 of the wavelength converting device 21 under predetermined conditions.

In the waveguide 19, consequently, the polarization is periodically inverted by the polarization inverting layer 14, and such a polarization is perpendicular to both of the waveguide direction of the waveguide 19 and the normal of the main surface 15 of the device substrate 16, so that the laser beam and the polarization wave generated in association with the propagation of the laser beam are interfered and added without mutually setting off. Thus, a large amount of output of the second harmonic is produced.

In general, the laser beam which is emitted from the semiconductor laser 31 has a plane of polarization which is parallel to the PN junction in the semiconductor laser device. And distribution of an electromagnetic field induced in the waveguide formed in the semiconductor laser 31 to enclose the light is in the TE mode. The waveguide has an effective shape such that a width is equal to a few μm and a thickness is equal to a value within a range from a fraction of the width to about ½ thereof. Therefore, a light distribution on the near-field 32 of the semiconductor laser 31 has an elliptic shape having a major axis in the PN junction direction according to the cross sectional shape of the waveguide. Further, even in the case where the laser beam is converged to the surface 20a of the waveguide 19 of the wavelength converting device 21 through the optical elements such as a lens and the like, the converged laser beam also similarly has an elliptic shape having a major axis in the direction corresponding to the PN junction direction.

On the other hand, a width of the waveguide 19 of the wavelength converting device 21 is generally larger than its thickness, so that distribution of an electromagnetic field of the beam to be waveguided has an elliptic shape whose major axis is corresponds to the width direction. In addition, the polarization of the polarization inverting layer 14 is parallel to the width direction, so that the plane of polarization of the beam to be waveguided is in the TE mode and is parallel to the width direction.

As a result, the mode of the beam which is emitted from the semiconductor laser 31 coincides with the mode of the beam to be waveguided, so that the near-field of the semiconductor laser devise is directly coupled to the incident surface of the waveguide.

As mentioned above, the optical element such as half-wave plate, TE-TM mode converter, and the like which have been used is unnecessary for making the modes coincident. Therefore, the near-field 32 of the laser beam of the semiconductor laser 31 can be directly coupled to the incident surface 20a of the waveguide 19, so that the number of parts constructing the apparatus for producing the second harmonic is reduced and the apparatus is miniaturized.

According to the above manufacturing method, a plurality of device substrates 16 can be cut out from the single crystal block 11 which was subjected to the single step of forming the polarization inverting layers 14. Thus, the step of forming the polarization inverting layers 14 for every device substrate 16 is unnecessary. Therefore, a productivity of the wavelength converting device 21 may be improved.

In the wavelength converting device according to the invention, the polarization in the waveguide in which polarization inverting layers are periodically formed along the waveguide direction is perpendicular to the waveguide direction and the normal of the main surface of the device substrate and is periodically inverted along the waveguide direction, so that the waveguide mode is the TE mode. Therefore, for instance, the laser beam emitted from the semiconductor laser or the like in the TE mode is allowed to directly enter the wavelength converting device and is converted into the second harmonic, so that a large amount of an output of the second harmonic can be led out. As a result, the near-field of the laser is directly coupled to the incident surface of the waveguide, so that the optical parts such as half-wave plate, TE-TM mode converter, and the like are unnecessary. And the number of parts constructing an apparatus for producing the second harmonic can be reduced and the apparatus can be miniaturized.

According to the invention of the method for manufacturing said wavelength converting device, a plurality of device substrates can be cut out from a single crystal block in which the polarization inverting layers are formed. And then it is unnecessary to form the polarization inverting layer every device substrate, so that the productivity of the wavelength converting devices can be improved.

What is claimed is:

1. A wavelength converting device comprising:
    a waveguide for generating a second harmonic of an incident laser beam, said waveguide being formed in a main surface of a substrate made of a nonlinear optical crystal, said substrate having polarization whose direction lies in said main surface, wherein said waveguide includes a plurality of polarization inverting layers in which polarization is perpendicular to a waveguide direction of the waveguide and periodically inverted to the polarization of said substrate along the waveguide direction.

2. A method for manufacturing a wavelength converting device, said method comprising the steps of:
    periodically forming a plurality of polarization inverting layers by scanning an electron beam a plurality of times at predetermined intervals on a surface which crosses a polarization of a nonlinear optical crystal block;
    cutting out a device substrate from said nonlinear optical crystal block in which the polarization inverting layers have been formed so that a normal of a main surface of the device substrate is caused to be perpendicular to said polarization; and
    forming a waveguide onto the main surface of the device substrate, said waveguide extending perpendicularly to the polarization of each of said polarization inverting layers in a waveguide direction.

3. The method as defined in claim 2, wherein said forming step includes forming a resist film on the main surface.

4. The method as defined in claim 3, wherein said forming step further includes forming an opening pattern on the resist film.

5. The method as defined in claim 4, wherein said opening pattern is formed with a mask.

6. The method as defined in claim 2, wherein said forming step is provided by a Ti diffusion process in which a Ti film is evaporated onto the main surface.

7. The method as defined in claim 6, wherein said Ti diffusion process includes an etching step and a heat treatment step.

8. The method as defined in claim 6, wherein the formed waveguide has a thickness which is not greater than one-half of its width.

* * * * *